US007970673B2

(12) United States Patent
Epple et al.

(10) Patent No.: US 7,970,673 B2
(45) Date of Patent: Jun. 28, 2011

(54) METHOD, APPARATUS, AND COMPUTER PROGRAM PRODUCT FOR REPOSITORY DATA MAXIMIZATION

(75) Inventors: Renee Epple, Chester, NY (US); Will C. Frampton, Scottsdale, AZ (US); Liz A. Fuller, Phoenix, AZ (US); Andrew M. Grogger, Scottsdale, AZ (US); Marcel Leyva, Chandler, AZ (US); Joya A. Mukherjee, New York, NY (US); Sally L. Niblock, Phoenix, AZ (US); Martin J. Preciado, Warwick, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 1514 days.

(21) Appl. No.: 11/261,437

(22) Filed: Oct. 31, 2005

(65) Prior Publication Data

US 2008/0021817 A1    Jan. 24, 2008

Related U.S. Application Data

(60) Provisional application No. 60/623,275, filed on Oct. 29, 2004.

(51) Int. Cl.
*G06Q 40/00* (2006.01)
(52) U.S. Cl. .............. 705/35; 705/39; 705/40; 705/42
(58) Field of Classification Search .............. 705/35
See application file for complete search history.

(56) References Cited

U.S. PATENT DOCUMENTS

| | | | | |
|---|---|---|---|---|
| 6,173,272 B1 * | 1/2001 | Thomas et al. | ............... | 705/42 |
| 6,574,377 B1 * | 6/2003 | Cahill et al. | ............... | 382/305 |
| 6,754,640 B2 * | 6/2004 | Bozeman | ............... | 705/40 |
| 7,124,113 B1 * | 10/2006 | Fairclough et al. | ............... | 705/50 |
| 7,185,805 B1 * | 3/2007 | McShirley | ............... | 235/379 |
| 7,213,003 B1 * | 5/2007 | Kight et a | ............... | 705/40 |
| 2001/0044765 A1 * | 11/2001 | Wolberg | ............... | 705/35 |
| 2002/0062282 A1 * | 5/2002 | Kight et al. | ............... | 705/40 |
| 2002/0087344 A1 * | 7/2002 | Billings et al. | ............... | 705/1 |
| 2002/0111886 A1 * | 8/2002 | Chenevich et al. | ............... | 705/30 |
| 2003/0033245 A1 * | 2/2003 | Kahr | ............... | 705/39 |
| 2003/0089767 A1 * | 5/2003 | Kiyomatsu | ............... | 235/379 |
| 2004/0172360 A1 * | 9/2004 | Mabrey et al. | ............... | 705/40 |
| 2004/0215560 A1 * | 10/2004 | Amalraj et al. | ............... | 705/40 |
| 2004/0247168 A1 * | 12/2004 | Pintsov et al. | ............... | 382/137 |
| 2006/0136332 A1 * | 6/2006 | Ziegler | ............... | 705/39 |

* cited by examiner

*Primary Examiner* — Jagdish N Patel
*Assistant Examiner* — Kevin Poe
(74) *Attorney, Agent, or Firm* — Snell & Wilmer L.L.P.

(57) ABSTRACT

A financial institution may use the bank routing and account number information (ABA/DDA) of a checking account or the like, obtained from paper checks previously submitted by a customer, in an electronic payment program. When a customer who has previously paid a credit balance by check, for example, wants to enroll in the electronic payment program, an abbreviated enrollment process is provided in which the consumer only enters a portion of bank routing information, instead of having to enter the full ABA/DDA as in the standard enrollment procedure. In some cases, the customer may leave such information blank and needs only to confirm that the stored bank account information corresponds to the account being used for the electronic payment.

21 Claims, 11 Drawing Sheets

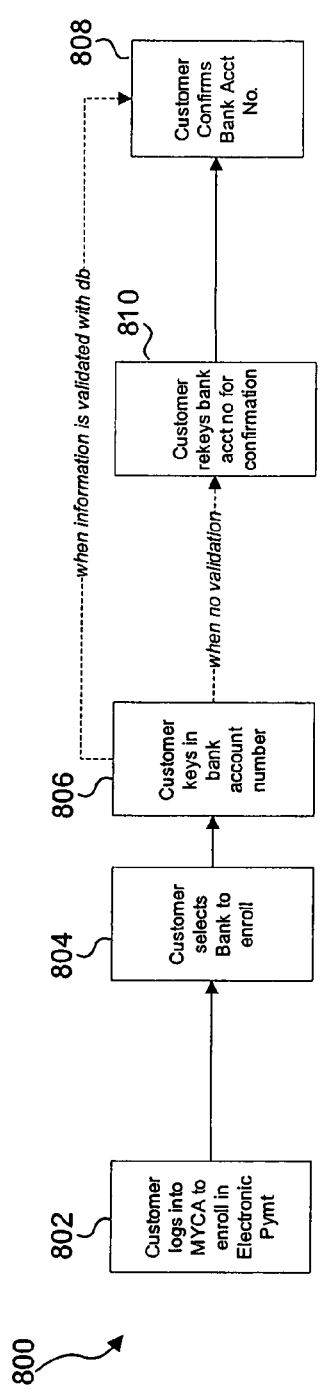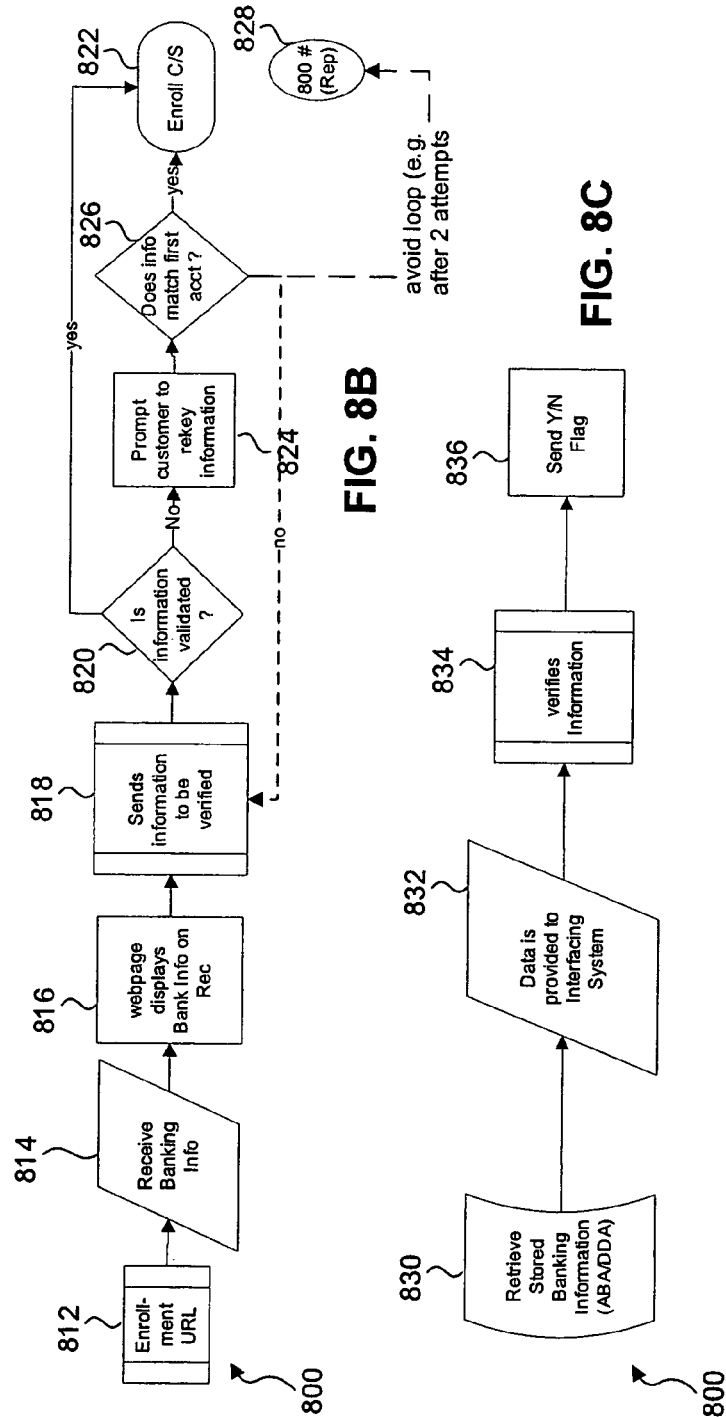

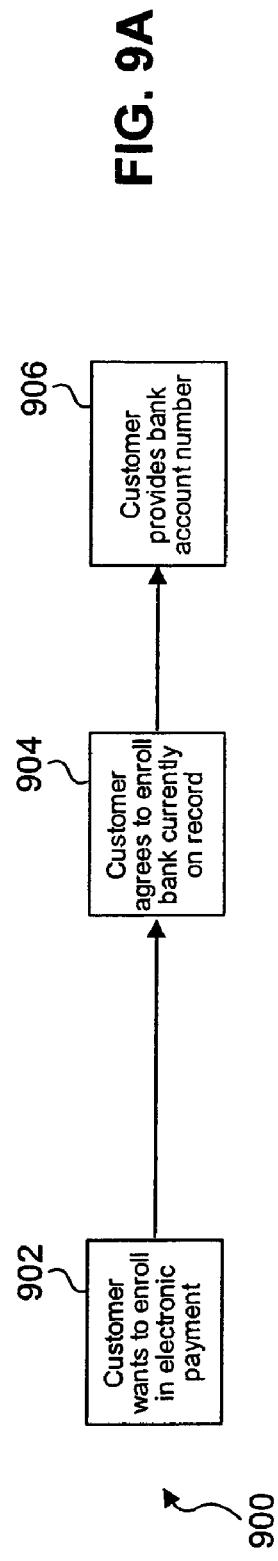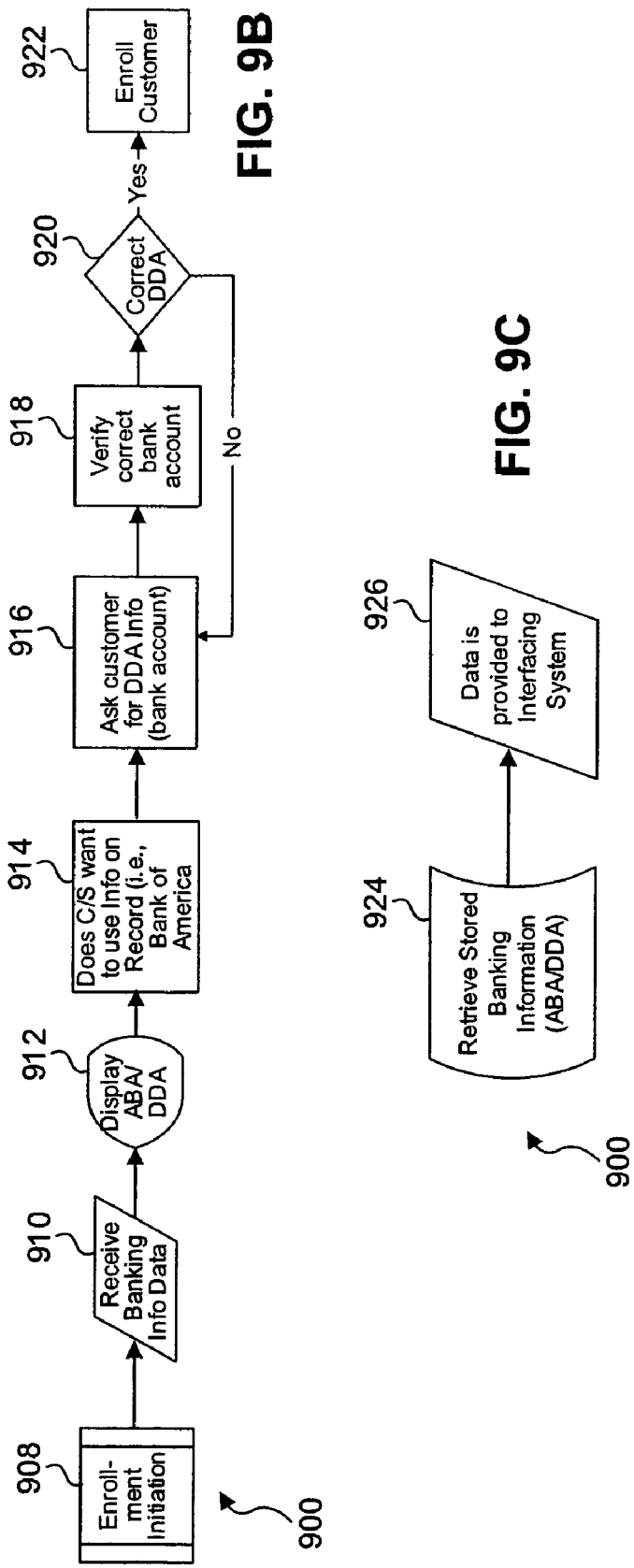
FIG. 9A
FIG. 9B
FIG. 9C

METHOD, APPARATUS, AND COMPUTER PROGRAM PRODUCT FOR REPOSITORY DATA MAXIMIZATION

CROSS REFERENCE TO RELATED APPLICATIONS

The present application claims the benefit of U.S. Provisional Application No. 60/623,275, filed Oct. 29, 2004, which is hereby incorporated by reference herein in its entirety.

BACKGROUND OF THE INVENTION

1. Field of the Invention

The present invention generally relates to data processing, and in particular it relates to funds transfers and credit transactions 2. Background Art The current enrollment and payment request process used by many financial institutions, such as credit, charge card, or credit card providers, to allow customers to process electronic payments requires that the customer provide bank routing and bank account information to the financial institution at the time the enrollment or payment request is initiated. The routing and bank account information typically corresponds to a non-credit account (e.g., a checking or savings account) from which the payment is to be made. These processes are intended to reduce operating costs in handling paper-based transactions by allowing customers to instead pay credit balances electronically. However, the process has produced as many as 77,000 returned transactions in a single year, which represents over $1 billion in lost or delayed payments. This is primarily because customers have inadvertently, or sometimes fraudulently, provided incorrect bank account identification and routing information.

This has been the case even where customers are required to provide their banking account identification and routing information twice, as a confirmation of the entry. Rather than improving upon the occurrence of returned transactions, the requirement of double entry of such information can serve to deter a customer from completing an electronic transaction due to the extra time required for this task, thus adversely impacting the potential of the financial institution to reduce operating costs by implementing electronic payments.

Accordingly, there is a need to improve customer enrollment and payment request processes.

BRIEF SUMMARY OF THE INVENTION

A method, apparatus, and computer program product enrolls customers in an electronic payment program in which payment information is captured and stored in a database that is accessible by a customer's financial institution. This payment information may include bank routing numbers and bank account numbers for a plurality of payments processed for a plurality of customers over a previous period of time. When a customer initiates an electronic payment program enrollment request and/or an electronic payment request with the financial institution that requires a bank routing number and a bank account number, such information may be retrieved from the database by the financial institution, and may be further presented to the customer for confirmation. The electronic request may thus be processed without customer entry of the complete bank routing number and bank account number.

In one embodiment, the customer may enter only partial bank account information, after which the partial entry is compared to payment information in the database to determine the complete bank routing and identification numbers needed. In the case where no matching entry is found, the customer may be asked to provide a confirmation of the partial entry or to enter the complete information.

In another embodiment, the customer may provide either a partial or complete entry of a bank account number, which then may be used to identify and compare complete bank account number and bank routing number information using the database. The retrieved information may then be presented to and confirmed by the user.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 8 is a flowchart of an example customer payment request or enrollment process initiated through a computer network.

FIG. 9 is a flowchart of an example customer payment request or enrollment process initiated through a telephone call.

The present invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1:
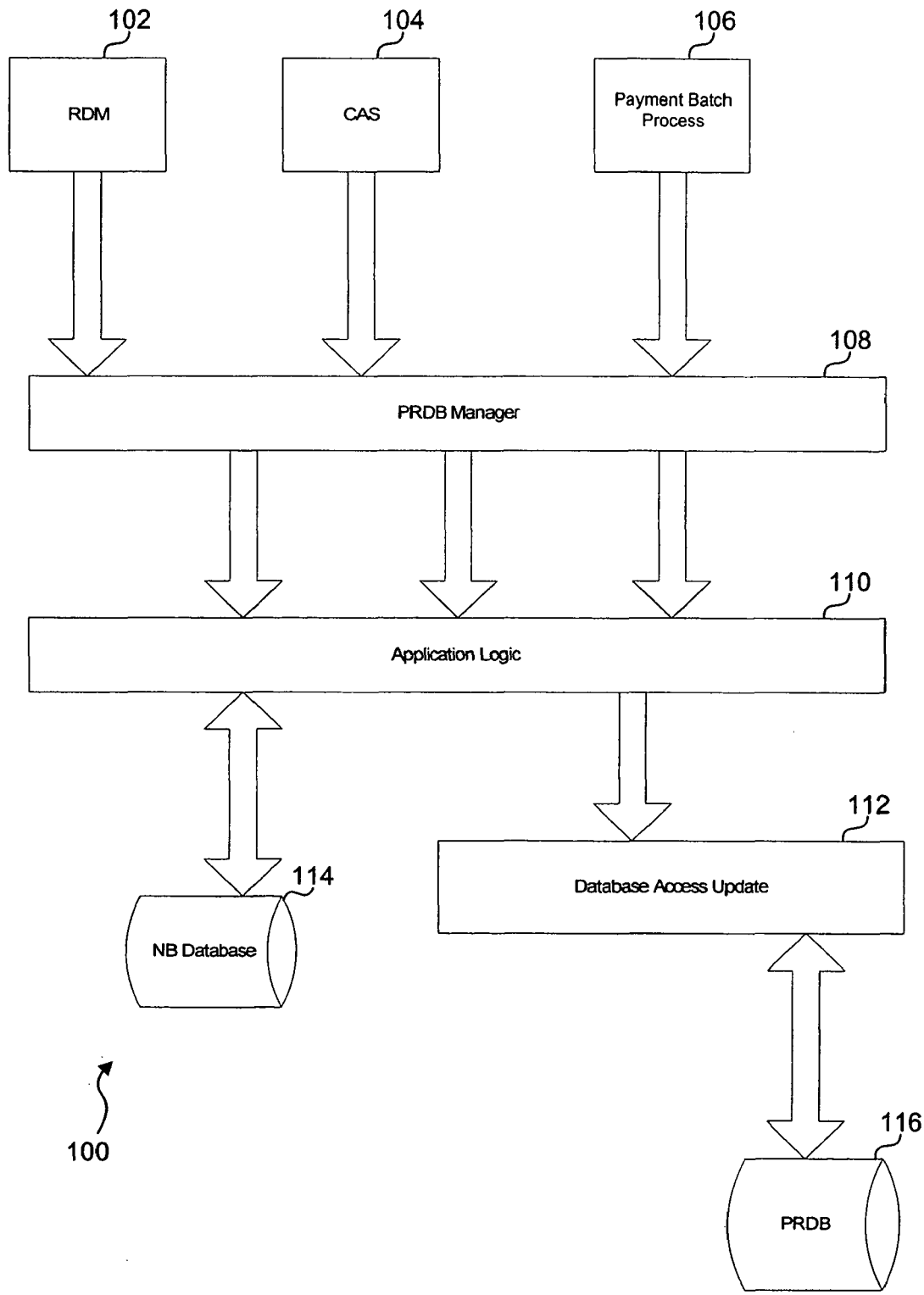
FIG. 1 is a block diagram of exemplary cooperating data source and database components.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user", "end user", "consumer", "customer", "participant", and/or the plural form of these terms are used interchangeably throughout herein to refer to those persons or entities capable of accessing, using, being affected by and/or benefiting from the tool described herein.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument. The terms "account provider" or "financial institution" as used herein refer to the financial institution associated with the account.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$$N_1N_2N_3N_4\ N_5N_6N_7N_8\ N_9N_{10}N_{11}N_{12}\ N_{13}N_{14}N_{15}N_{16}$$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. Payment Record System

As an alternative to writing and sending paper checks, a customer having a balance with a financial institution for, e.g., a credit or charge account, may pay all or a portion of that balance electronically. In order to process the received electronic payment, the financial institution typically needs at least the related American Banking Association/Demand Deposit Account (ABA/DDA) information (such as bank routing number and account number). In current electronic payment request and enrollment processes, a financial institution has no way to validate that the banking information provided by a customer is a valid account, or that the customer is an authorized signor on the account for which information is submitted. This has led to many errors in the processing of electronic payment requests.

In cases where customers have a payment history with the financial institution, the ABA/DDA information used for paper payments (that is, payments previously made to the financial institution by a check or other valid instrument) may have already been recorded and stored by the financial institution in a payment database or repository. The processes disclosed herein leverage ABA/DDA information in the payment repository to match or confirm ABA/DDA information submitted by a customer during the enrollment and maintenance processes. This improves the customer experience, as well as reduces risk and increases revenue for the financial institution.

FIG. 1 depicts a block diagram 100 of exemplary cooperating data source and database components of a financial institution. A repository data maximization (RDM) software management component 102 manages the exchange of bank routing and account information in the enrollment and payment request processes used by a customer. A credit authorization system (CAS) 104 provides data about successful and/or unsuccessful payments involving customers. Payment batch process software 106 coordinates the storage of relevant payment data to a backup device such as, for example and without limitation, a tape backup device. A payment returns database (PRDB) manager software component 108 and application logic 110, in combination with database access update software 112, are provided to coordinate transfer of data to and from a negative bank database (NBDB) 114. NBDB 114 may register invalid bank information on returned customer payments. The PRDB 116 may store valid bank information on payments returned due to insufficient balances or the like. It should be readily apparent that the hardware and software configurations for storing and utilizing payment information may very greatly in detail, and that the scope of the present invention is not to be limited to the configurations and descriptions provided herein.

Figure 2:
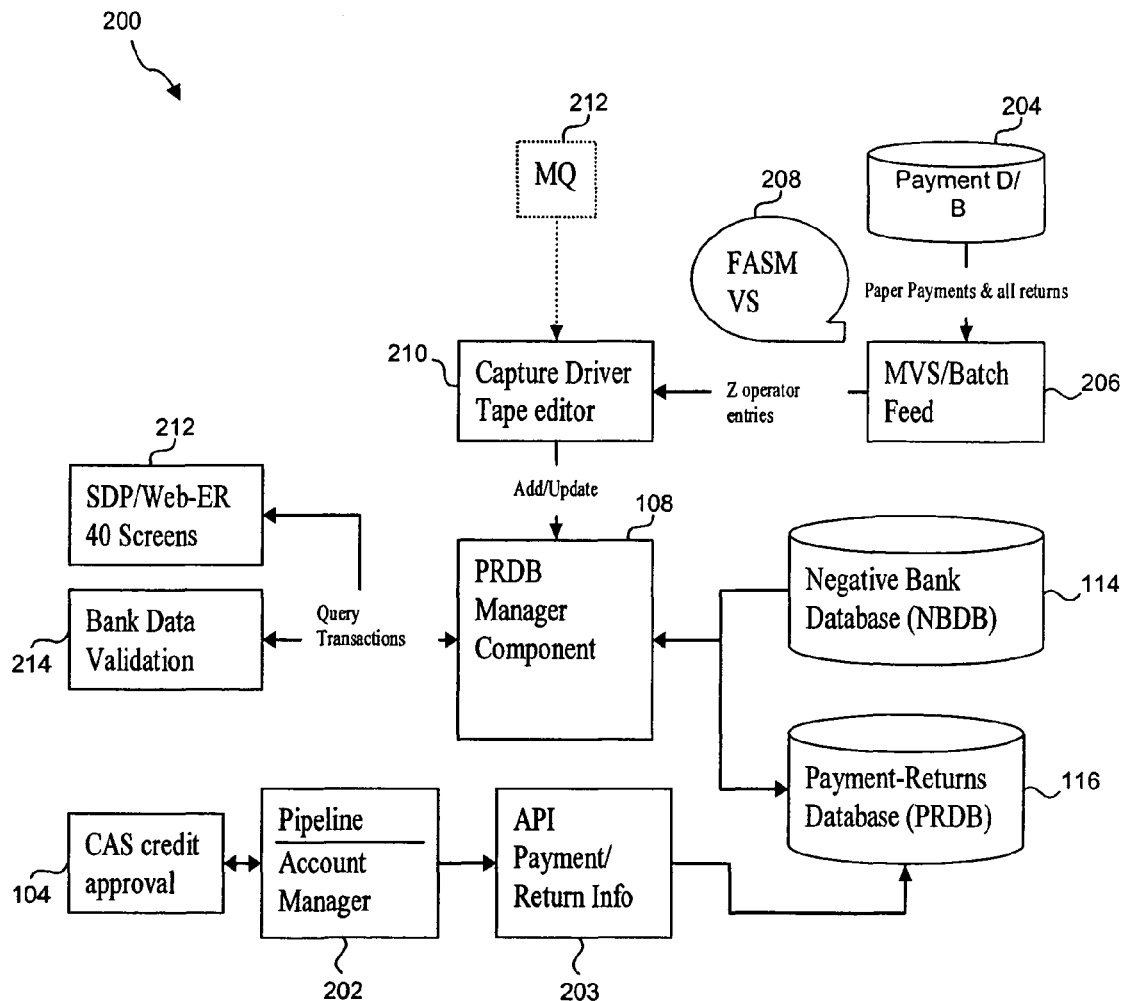
FIG. 2 is a block diagram of exemplary interactions between certain database components of FIG. 1 and sources of data for storage by the database components.

FIG. 2 is a block diagram 200 of exemplary interactions between certain database components of FIG. 1 and sources of data providing clearance and return information for storage by the database components.

Payment clearance data may be provided by CAS 104 and routed to PRDB 116 through an account manager pipeline 202 and application logic 203 for handling payment return information. PRDB manager component 108 may query for and coordinate information received from a web-based customer service delivery platform and external bank validation sources. PRDB manager component 108 may also transmit appropriate information to NBDB 114 and PRDB 116. In addition, PRDB manager component 108 may receive payment information from the financial institution's internal clearinghouse payment database 204 and the backup services that maintain it.

In one example, a batch tape 206 from a multiple virtual storage (MVS) 208 or a similar backup management process of a funds access service (FAS), containing payment and/or return information, is read and processed by the payment tape capture utility 210. In another example, the batch tape is substituted by a message queue (MQ) editor and/or driver 212, if the feed comes through via MQ. Although backup devices in the present invention will be described herein with reference to batch tapes, a person skilled in the relevant art will understand that other processes, such as MQ and the like, may be used without departing from the spirit and scope of the present invention. The data may be identified and validated using a query transaction with service delivery platform (SDP) screens 212 and/or a bank data validation software component 214. After validation and identification of the data, an interface with PRDB 116 is called with the tape item as the input to add it into PRDB 116. Tape processor 210 validates and identifies payment and return records. The records built into the PRDB logical record formats and PRDB manager 108 are called to add and/or update the records into PRDB 116. The information managed by PRDB manager component 108, such as and without limitation, information from payment database 204, NBDB 114 and/or PRDB 116 will be referred to herein as the payment repository.

Figure 3:
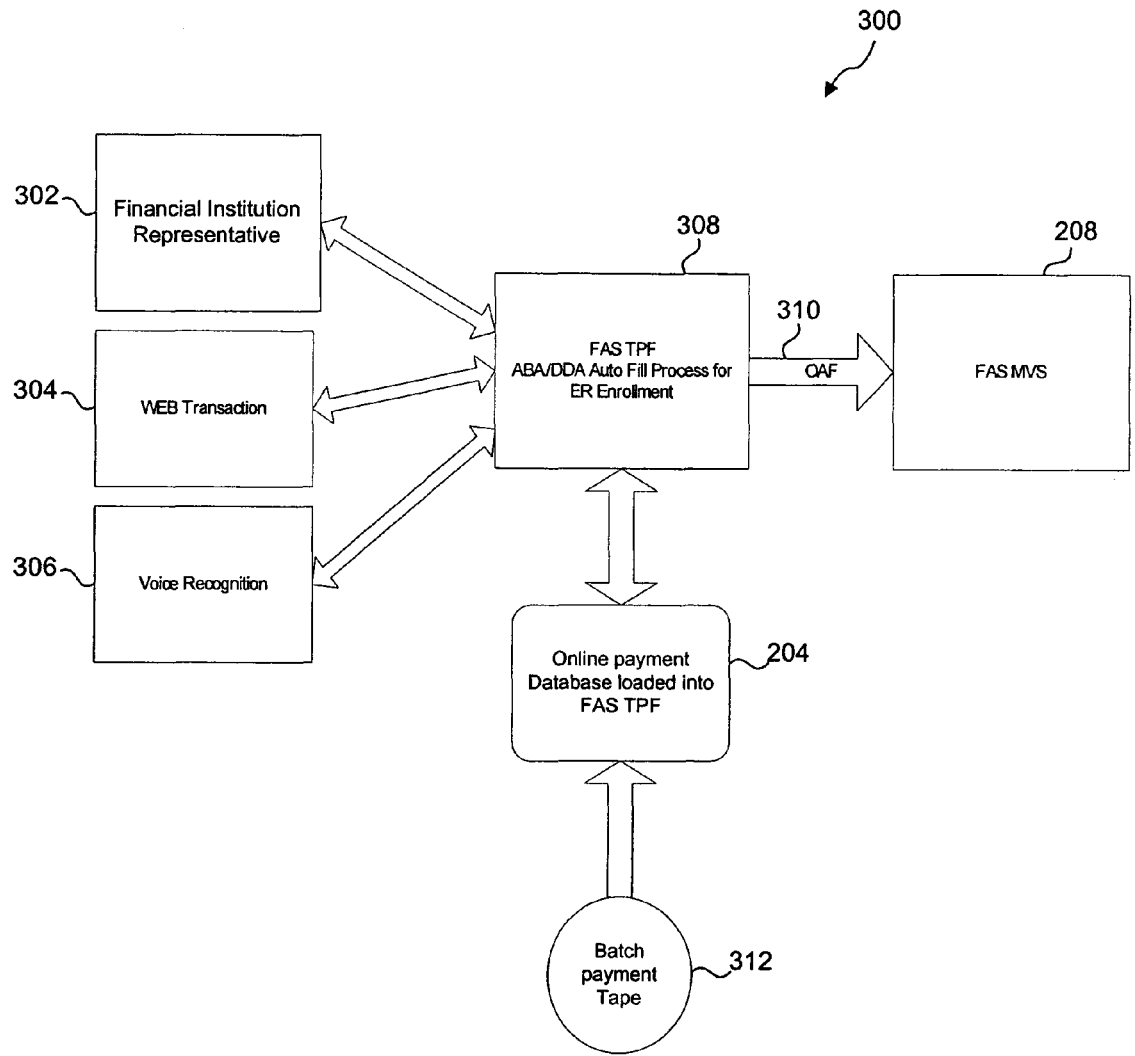
FIG. 3 is a block diagram of exemplary interactions between customer accessible systems and certain database components of FIG. 1.

FIG. 3 is a block diagram 300 of exemplary interactions between customer accessible systems and certain database components of FIG. 1. Electronic payment requests to be processed by a financial institution will generally come from customers or card members. These requests may come through, for example and without limitation, a financial institution customer representative 302, a Web/Internet payment request interface 304, or an interactive voice response unit (IVRU) 306. In an example embodiment, an FAS transaction processing facility (TPF) 308, which is the online operating system, requests and receives ABA/DDA information from payment repository 305 via MQ or another similar messaging system. FAS TPF 308 logs transaction information to FAS MVS 208 via the online activity file (OAF) tape 310. A daily feed into FAS TPF 308 with paper payments, third party payments, and/or returns may be provided. Payment repository 305 may be built on FAS TPF 308 with information regarding, for example and without limitation, the Routing/Transit (RT) and/or DDA, the dollar amount, the date, the payment returns, and/or convenience check/money orders for a given period of time.

In the embodiment of FIG. 3, FAS TPF 308 prefills the ABA/DDA of a customer record with valid payment data during an electronic payment request or enrollment. The same data may be provided in external interface inquiries for prefill or validation per customer/business level requirements. The valid payment date may be determined from the RT/DDA information from non-returned payments that were not from a one-time payment instrument, such as a convenience check or money order. CAS 104 may use the detailed payment data from payment repository 305 to adjust existing CAS variables during authorization of an electronic payment request or enrollment.

Figure 4:
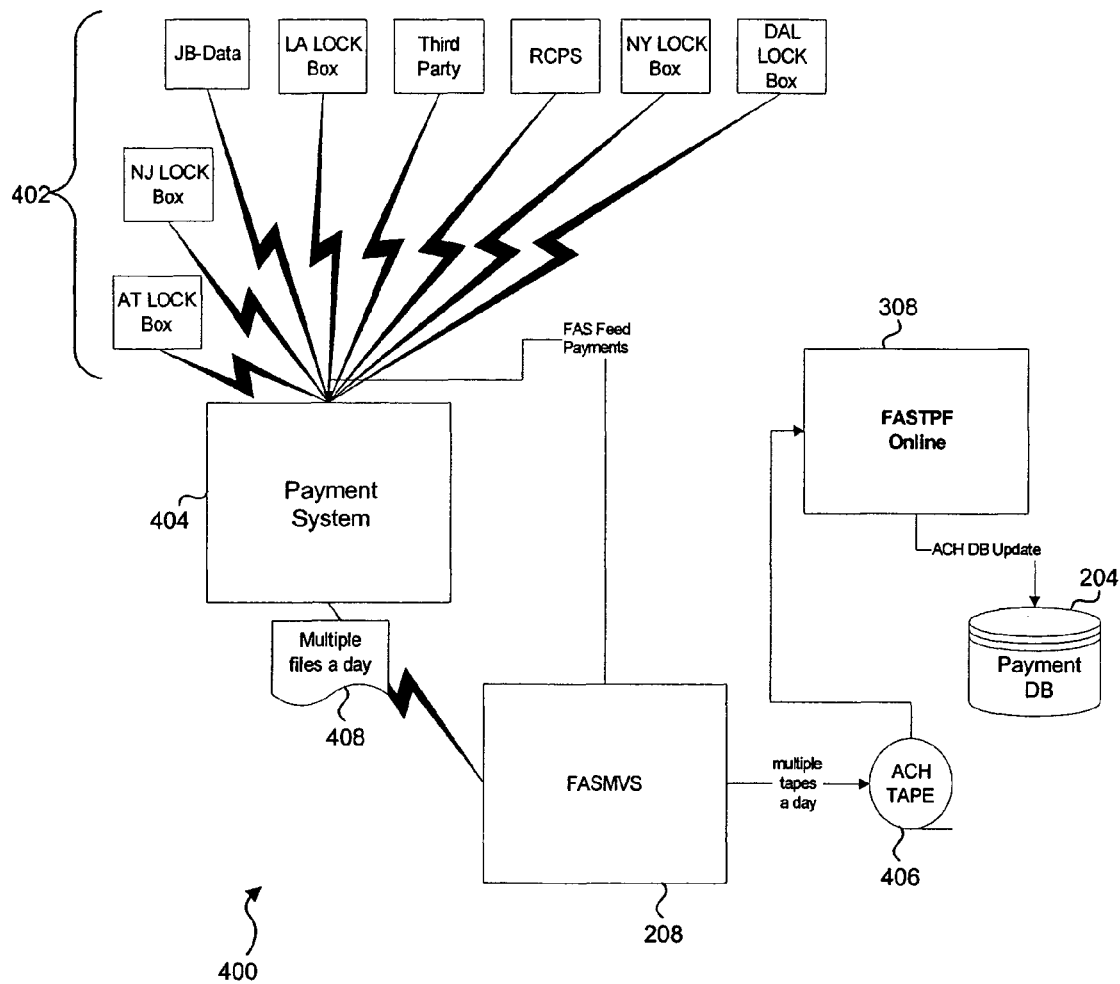
FIG. 4 is a block diagram of exemplary interactions between data sources and data backup mechanisms according to the present disclosure.

FIG. 4 is a block diagram 400 of exemplary interactions between data sources and data backup mechanisms. Bank payment and return data may be received from various data payment sources 402. Various data payment sources 402 include, for example and without limitation, lockboxes from different areas, payments processed at a remit center of the financial institution (JB-Data), third party processor returned items (Third Party), ACH returns processed at a remit center (RCPS), and returned items from FAS (FAS feed payments). Sources 402 may be physically located in geographically separate locations. The received data may be fed into FAS TPF 308 from payment system 404 through a batch feed 408 of FAS MVS 208 on a timely basis. This data is formatted and routed via FAS MVS 208. The tape capture may be triggered by MVS mounting and/or decataloging of the tape for FAS TPF 308, followed by operator (console) entries to start and complete the jobs.

FAS MVS 208 edits and formats data onto a tape 406. The formatted data is used to build TPF batch tape 312 to FAS TPF 308, to add and/or update the payment and/or return logical record in payment repository 305. Hence, payment batch feed editor 210 (via FAS MVS 208) builds an interface record for each logical record encountered and added/updated in payment repository 305 accordingly.

The process of retrieving and/or editing data from the tape feed can be controlled based on the system load and performance at the time of the batch process. The batch process can be paused, stopped, aborted, rerun and restarted by operator and/or console entries. If the system is running with a relatively light load, then the capture process has the ability to increase the number of ECBs used in the capture process.

Batch feed 408 from payment system 404 contains data for all paper payments and returns, as well as electronic returns, including FAS returns and FAS electronic remits. Direct Debit, CRT drafting, and wire transfer may likewise be reviewed by FAS MVS 208 to confirm that appropriate payment and/or return information is properly sent to payment repository 305.

Figure 5:
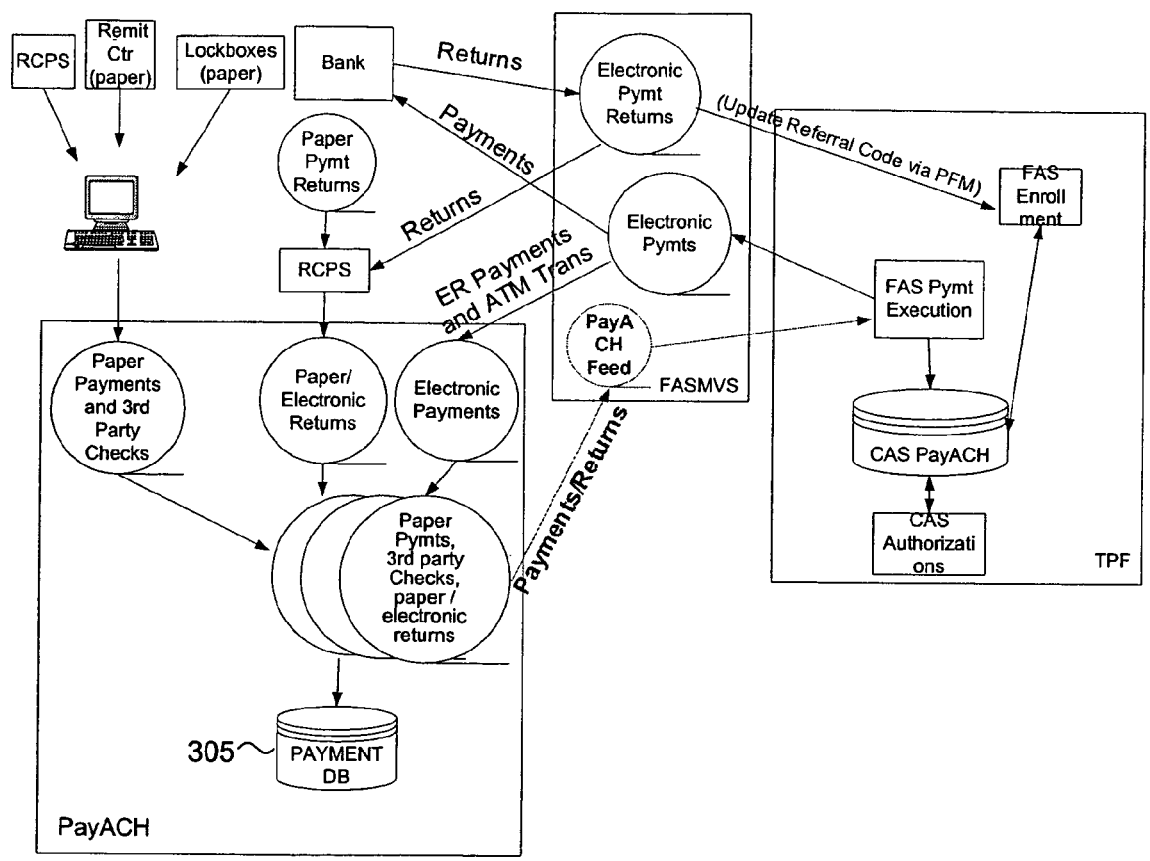
FIG. 5 is a block diagram of exemplary interactions between the elements of FIGS. 1 through 4.

FIG. 5 is a block diagram of exemplary interactions between elements of FIGS. 1 through 4, which shows how payment information is provided to payment repository 305 from various internal and external sources, and retrieved and routed for use with the electronic payment request and enrollment processes.

Payment system 404 creates an update file every time a feed from an internal or external data source is received. At a specific time (e.g., midnight), all of the updated files are merged. Payment repository 305 is then updated and/or loaded in a backup process. Payment system 404 may transmit the update files to FAS for every feed received. The feeds to FAS can be customized to transmit only the feeds that FAS needs to store in payment repository 305. For example, the first two bytes in a file from payment system 404 may indicate the source type (e.g., feeder system) and the next two bytes may indicate the transaction type (e.g., payment or return).

Figure 6:
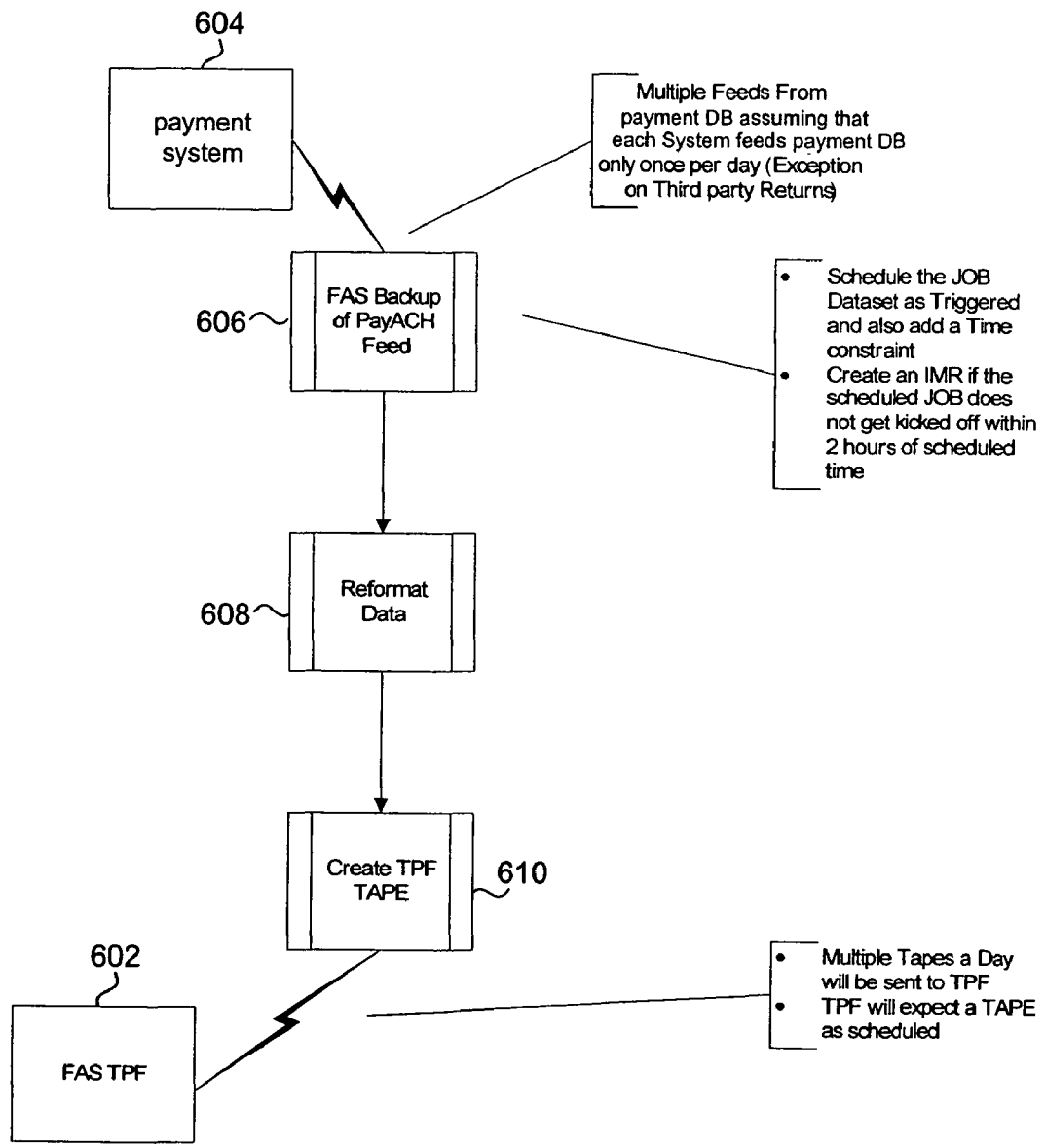
FIG. 6 is a flowchart of an exemplary backup process.

FIG. 6 is a system and process diagram of an exemplary backup process 600 for use with a payment system 604 and FAS TPF 602. In step 606, a backup of the payment batch feed is created. There may be multiple feeds in the payment batch feed if each system feeds payment system 604, for example, once per day. FAS TPF 602 may schedule a job with an approximate start time for each feed from payment system 604. These jobs are then executed to start processing of the payment data.

In step 608, the backup data is reformatted, if necessary, into a format readable by FAS TPF 602. In step 610, a TPF backup tape is created. Multiple tapes each day may be sent to FAS TPF 602. These tapes may be sent according to a schedule of FAS TPF 602.

Figure 7:
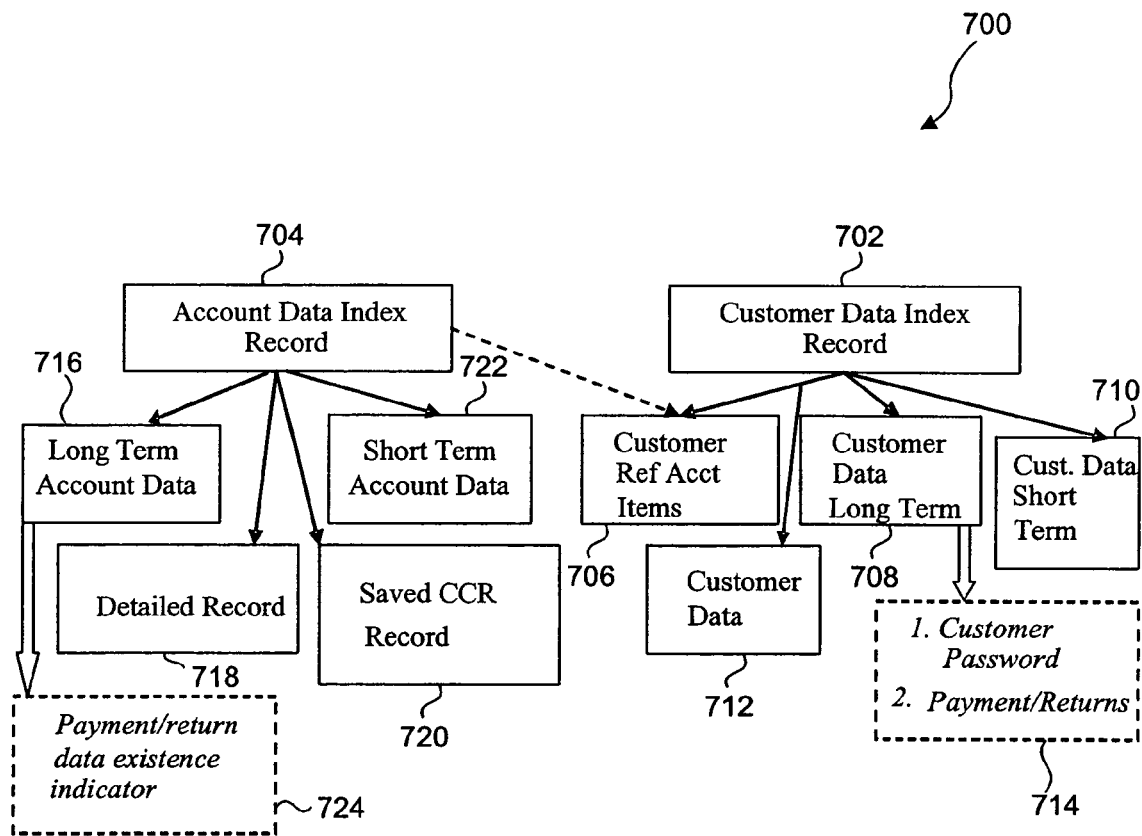
FIG. 7 is a block diagram of account and customer data stored by the database components of FIG. 1.

FIG. 7 is a block diagram 700 of example account and customer data stored by the database components of FIG. 1. As new items are added into PRDB 116, both the customer level index 702 and account level index 704 of PRDB 116 may need to be built. Customer level index 702 can be built when adding the new records. Customer level index 702 may include data from account items 706 associated with a customer reference, long term customer data 708, short term customer data 710, and other customer data 712. Long term customer data 708 may include customer password and particular payment and/or return information 714. Account level index 704 may be built by account number. Account level index 704 may include data from long term account data 716, detailed record information 718, saved CCR record 720, and short term account data 722. Account level index 704 may also receive input from data from account items 706 associated with a customer reference. Long term account data 716 may include a payment/return data existence indicator 724 for readily identifying the existence of payment and/or return information for each customer.

One or more reports may be generated by the payment repository system. A summary of bank routing and corresponding account information at the business/customer level for a given prior time period (e.g., one year) may be created. Negative or fraudulent bank information residing at the ABA/DDA level, including particular ABA/DDA combinations that were previously tagged as negative or fraudulent in the financial company's credit authorization system (CAS) may be captured and reported. The reporting ability provides flexibility to quickly modify channel and/or level criteria based on the reports. For example, criteria may be modified within a given time frame based on a negative band report and/or return.

III. Repository Data Maximization

In order to address the concern that the banking information provided by a customer corresponds to a valid account, the payment history may be used to automatically retrieve the routing and account information needed to enroll the customer in an electronic payment program or to process a one-time electronic payment. Maximizing the use of previous bank information in this manner avoids many returns that result from customer error in entry of bank routing and account information. The opportunity to prevent entry of fraudulent banking information in order to prolong a customer's ability to spend is significantly improved. In addition, a financial institution adopting such processes has the opportunity to improve customer satisfaction as well as increase Electronic Remit/Express Cash (ER/EC) use, while at the same time reducing the manpower needed to handle payment returns.

The ability to cross-reference account enrollment at the business and/or customer level may also be provided. This is available for systems in which customers are allowed to enroll multiple bank accounts in the electronic payment program.

Electronic remit (ER) enrollment screens requiring bank account and routing information may be prefilled and validated for all or certain classes of consumers. The screens may be prefilled by the funds access service (FAS) which provides the most recent payment information in the payment database. Multiple accounts may be considered, from most recently used to last used, with account selection occurring on the first account that is assessed to be valid and in good standing. If no payment history is available, the FAS may allow enrollment upon confirmatory entry of bank routing and account information by the customer. An offline log record may be created to indicate whether enrollment is with an unknown bank account. It is necessary to ensure that validation and pre-fill procedures do not negatively impact the response time in processing or in interacting with a customer. Additionally, there should be no negative impact to customer service representatives.

Turning now to FIGS. 8A, 8B, and 8C, illustrated is an example customer payment request or enrollment process 800 initiated through a computer network, such as an Internet interface between the customer and a financial institution. FIG. 8A is a flowchart of steps in process 800 that are taken by the customer. In step 802 the customer logs into a web interface such as web interface 304 and selects an electronic payment or enrollment option. Although the present invention will be described with reference to an enrollment process for an electronic payment program, a person skilled in the relevant art will recognize that similar techniques can be used to process a specific payment, such as a one-time electronic payment program, without departing from the spirit and scope of the present invention.

In step 804, the customer uses, e.g., a graphical user interface (GUI) to enter bank identification information for a bank account being enrolled in the electronic payment program. The bank information is related to a debit account (e.g., checking or savings account) of the customer from which the payment is to be made. The bank identification information may include, for example, an account identifier and/or an ABA routing number associated with the debit account. The payment may be, for example, a one-time or periodically recurring payment from the customer's debit account to the customer's credit account maintained by the financial institution. The information may be entered, for example, by selecting a bank identifier from a list of banks.

In step 806, the customer enters the required bank account information through, for example, the GUI. The customer may enter all or a part of the bank account information, which may be used to search stored payment data in a payment repository, such as payment repository 305, to retrieve corresponding complete bank account and routing information. In another embodiment, the information may be left blank by the customer. When the information is left blank, the payment system retrieves, from the payment repository, the most recently used ABA/DDA information for completing the customer's enrollment or payment request. If information entered in step 806 is validated through a comparison with data in the payment repository, the complete bank information can be displayed to the customer for confirmation. In step 808, the customer confirms the completed bank account information.

If the bank account information entered during step 806 is not validated (e.g., the payment repository does not include corresponding information), the customer is requested to re-enter the bank account information for confirmation. In step 810, the customer re-keys the information. Process 800 then proceeds to step 808, wherein the customer confirms the bank information.

FIG. 8B is a flowchart of steps in process 800 that are taken by the web interface system. In step 812, the graphical user interface (GUI) corresponding to the enrollment URL is displayed. The GUI includes a data entry field allowing the customer to enter bank information.

In step 814, the interface system receives bank information from the customer. In step 816, the interface system displays to the customer the bank information on record for that customer from, e.g., previous payments. In step 818, the bank information is sent to the payment system for validation.

In step 820, it is determined whether the bank information is validated. If the information has been validated using the payment repository, process 800 proceeds to step 822. In step 822, the customer is enrolled in the electronic payment system. If a determination is made in step 820 that the information has not been validated, process 800 proceeds to step 824. In step 824, the customer is prompted to re-enter the bank information.

In step 826, it is determined whether the re-entered information matches the information previously entered by the customer. If the information does match, process 800 proceeds to step 822. If the information does not match the information first entered, process 800 returns to step 818. An interrupt may be inserted into the loop to refer the customer to a customer service representative (CSR) 828 after a given number of tries.

FIG. 8C is a flowchart of steps in process 800 that are taken by the payment system. In step 830, once the payment system receives information to be verified, stored bank information, such as the ABA/DDA number, is retrieved from the payment repository. In step 832, the retrieved data is provided to the web interface system. In step 834, the information is verified. In step 836, a "yes" flag is sent to the interface system when the information corresponds to information in the payment repository, and a "no" flag is sent when the information does not correspond.

If information from the payment repository is not confirmed by the customer, or if other problems arise with the enrollment or payment request, the customer may be placed in contact with a customer service representative (CSR) in any of a variety of known manners. Upon confirmation of the information by the customer, on the other hand, the customer is enrolled (or the payment request is approved and processed) and the verified bank data and indication of approval may be stored in the payment repository.

FIGS. 9A, 9B, and 9C illustrate an example customer payment request or enrollment process 900 initiated by a telephone call between the customer and a customer service representative of the financial institution. The process proceeds in a similar manner to that described above with respect to FIGS. 8A, 8B, and 8C. However, in this embodiment, the customer has contacted the financial institution by telephone rather than by web interface. Thus, most of the enrollment and/or request process is handled manually by a CSR, such as CSR 302. The CSR may enter the information into the computer system of the financial institution according to responses received from the customer. The CSR may also receive the acceptance or refusal of the bank routing and account information from the payment system.

FIG. 9A illustrates steps in process 900 that are taken by the customer. In step 902, the customer telephones the CSR to enroll in the electronic payment program. In step 904, the customer responds to the CSR by agreeing to enroll a bank currently on record from, e.g., previous payments made by the customer. In step 906, the customer provides bank information to the CSR. As discussed with respect to FIG. 8A, the bank information may be all or a portion of the bank ABA and/or DDA number, or may not be provided at all.

FIG. 9B illustrates steps in process 900 that are taken by the CSR. In step 908, the CSR initiates the electronic portion of the enrollment procedure. In step 910, the CSR receives bank identification information from the customer. In step 912, the CSR receives corresponding ABA information from the payment repository. In step 914, the CSR asks the customer whether the customer wants to use the bank currently on record for the customer.

Upon a positive reply from the customer, in step 916, the CSR asks the customer for bank account information. Upon receipt of the bank account information from the customer, in step 918 the CSR verifies the bank account being enrolled. In step 920, it is determined whether the bank account information corresponds to the information in the payment repository.

If the information is correct, process 900 proceeds to step 922, in which the customer is enrolled. If the information is not correct, process 900 returns to step 916.

FIG. 9C illustrates steps in process 900 that are taken by the payment system. In step 924, upon request by the CSR, stored banking information is retrieved. In step 926, the retrieved information is provided to the CSR.

Figure 10A:
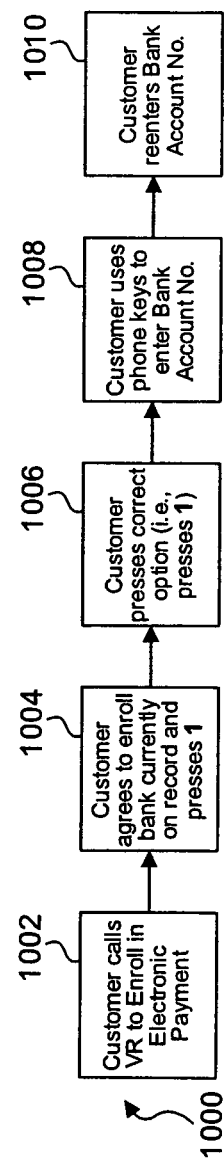
FIG. 10 is a flowchart of an example customer payment request or enrollment process initiated through an interactive voice response unit (IVRU).
Figure 10B:
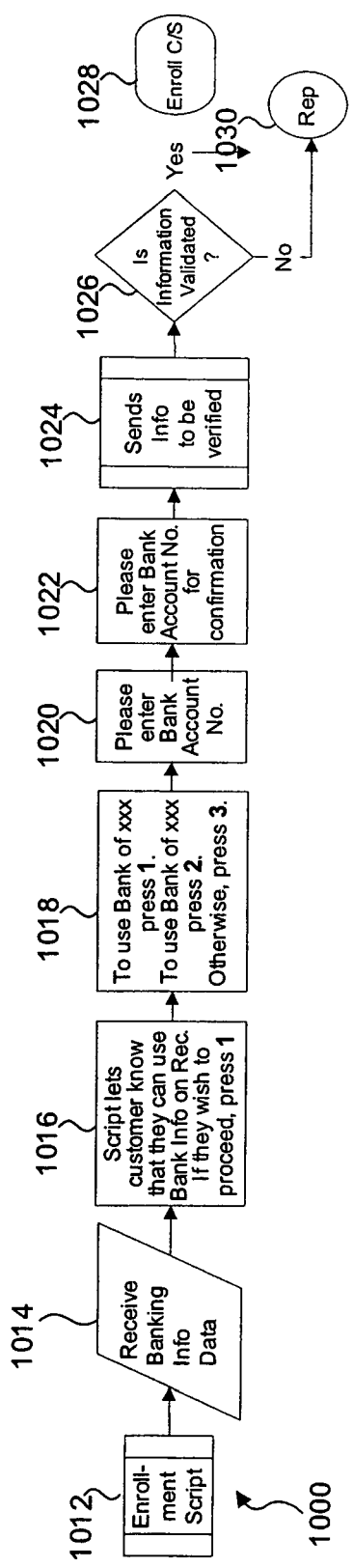
Figure 10C:
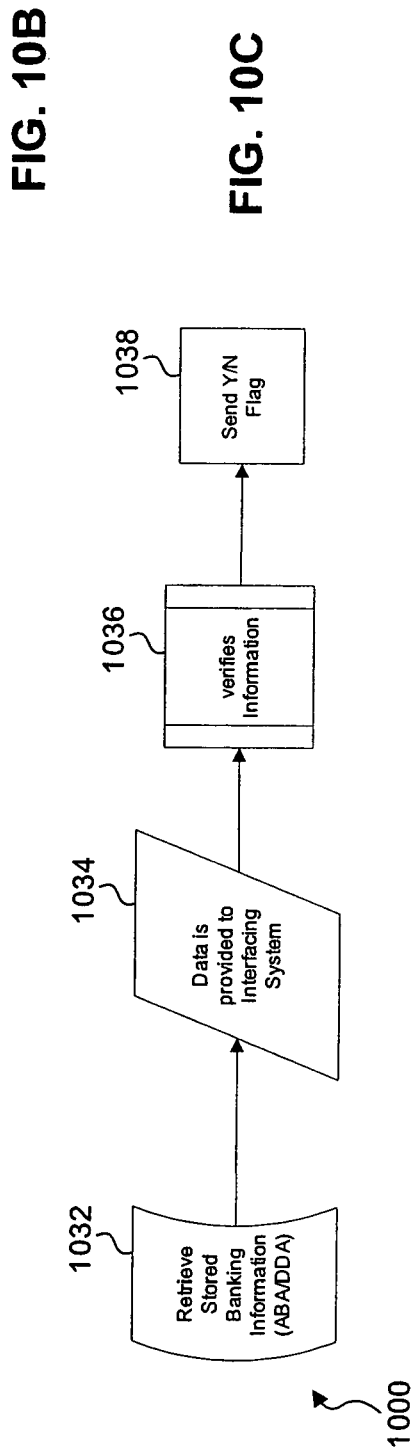

FIGS. 10A, 10B, and 10C illustrate an example customer enrollment or payment request process 1000 initiated through a customer telephone call to an interactive voice response unit (IVRU), such as IVRU 306. The process proceeds in a similar manner to that described above with respect to FIG. 8. However, in this embodiment, the customer has contacted the financial institution by telephone rather than by web interface. Thus, most of the enrollment and/or request process is handled by an appropriately programmed IVRU. The IVRU is a software program designed to communicate with the customer over a telephone connection in a manner similar to a live CSR.

FIG. 10A illustrates steps in process 1000 that are taken by the customer. In step 1002, the customer calls into the IVRU to enroll in the electronic payment system. Upon identification of the bank currently on record for the customer, in step 1004 the customer agrees to enroll the bank currently on record in the electronic payment system. In one embodiment, the customer response is entered using the keypad on the telephone in response to a menu provided by the IVRU. In another embodiment, the IVRU includes speech recognition software, which allows the customer to verbally respond to the IVRU.

If multiple banks are on record for the user, or if there are no banks on record for the user, the customer may receive a listing of banks to choose from for enrollment. In step 1006, the customer responds to the IVRU with a response corresponding to the bank with which the customer holds an account to be enrolled.

In step 1008, the customer indicates the bank account number to be used. As discussed with respect to FIG. 8A, the bank information may be all or a portion of the bank ABA and/or DDA number, or may not be provided at all. If an indication is given, such indication may be made through, for example, a keypad-entered response or a verbal response. In step 1010, the customer confirms the bank information.

FIG. 10B illustrates steps in process 1000 that are taken by the IVRU. In step 1012, the IVRU begins an enrollment script. In step 1014, the IVRU receives bank information from the customer.

Following the script, in step 1016 the IVRU indicates to the customer that the customer can use bank information on record. The IVRU may ask the customer for a specific reply, such as the pressing of a number, if the customer wishes to proceed. Alternatively or additionally, in step 1018 the IVRU may present the customer with a list of available banks. The IVRU may ask the customer for a specific response as an indication of the customer's choice.

In step 1020, the IVRU asks the customer for the bank account number associated with the chosen bank. In step 1022, the IVRU asks the customer to confirm the bank account number.

In step 1024, the IVRU sends the bank account information to the payment system to be validated against the payment repository. In step 1026, it is determined whether the information has been validated by the payment system. If the information is validated, process 1000 proceeds to step 1028, in which the customer is enrolled in the electronic payment system. If in step 1026 it is determined that the information is not validated, the IVRU refers the customer to a CSR 1030.

FIG. 10C illustrates steps in process 1000 that are performed by the payment system. In step 1032, stored bank identification information related to the customer is retrieved from the payment repository. In step 1034, the retrieved information is provided to the IVRU.

In step 1036, the bank account information provided by the customer is verified. In step 1038, a "yes" flag is provided to the IVRU when the information from the customer is verified, while a "no" flag is provided to the IVRU when the information is not verified.

By reducing the entry of bank routing and account information from the customer in the manners described above, the opportunities for errors and returns are greatly reduced. At the same time, negative impact to process time for enrollments or to the activities of customer service representatives is minimized. Further, opportunities for fraud in electronic transactions are reduced.

Once enrolled in the electronic payment program, for subsequent payments the user may log onto a payment website. Upon selecting the account to be paid, payment may automatically be drawn from the customer's account identified during enrollment. In this manner, subsequent entry of bank identification and account information is avoided.

IV. Example Implementations

The present invention or any part(s) or function(s) thereof may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary in any of the operations described herein which form part of the present invention. Rather, the operations are machine operations. Useful machines for performing the operation of the present invention include general purpose digital computers or similar devices.

Figure 11:
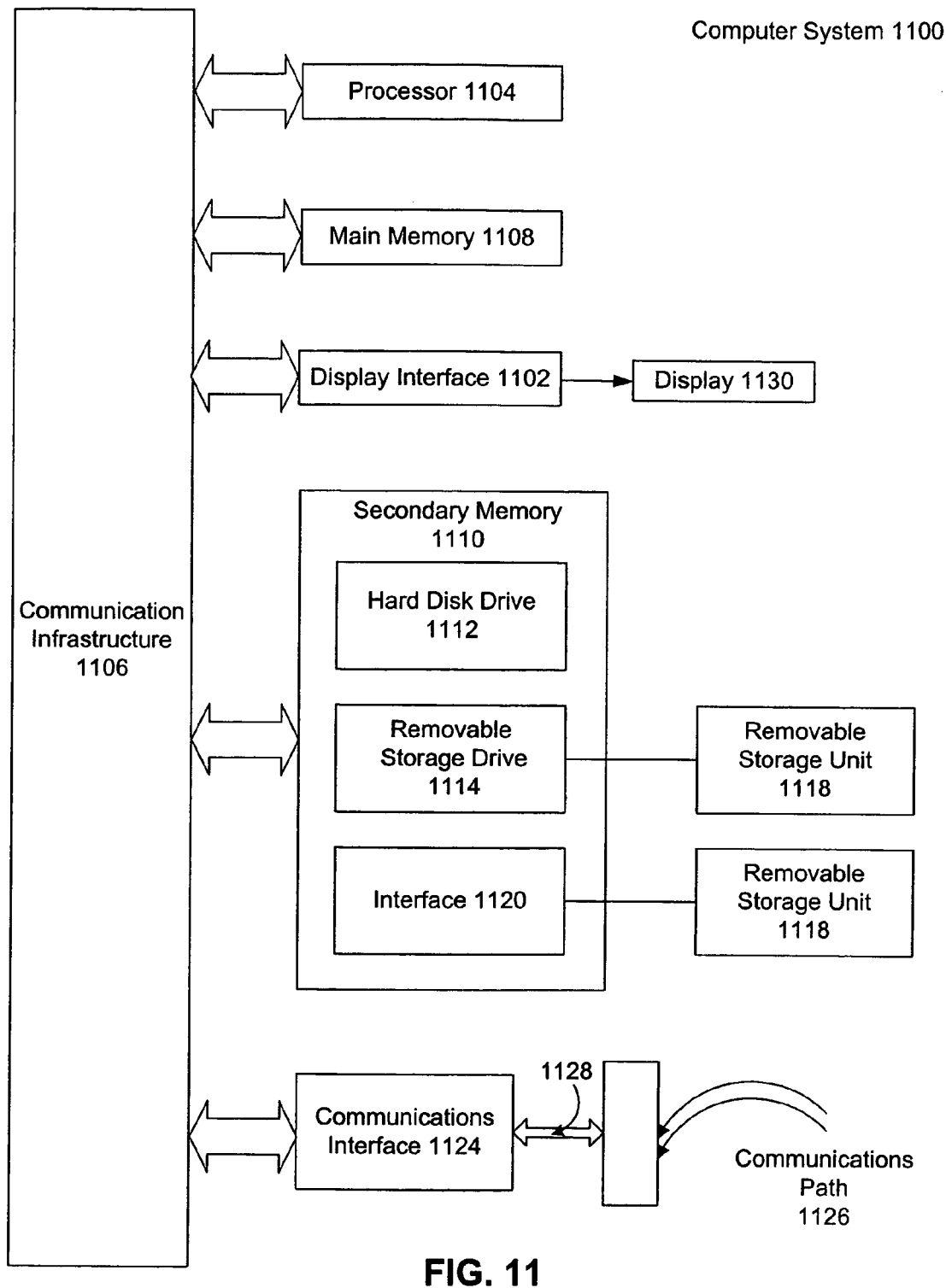
FIG. 11 is a block diagram of an exemplary computer system useful for implementing the present invention.

In fact, in one embodiment, the invention is directed toward one or more computer systems capable of carrying out the functionality described herein. An example of a computer system 1100 is shown in FIG. 11.

The computer system 1100 includes one or more processors, such as processor 1104. The processor 1104 is connected to a communication infrastructure 1106 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1100 can include a display interface 1102 that forwards graphics, text, and other data from the communication infrastructure 1106 (or from a frame buffer not shown) for display on the display unit 1130.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118 represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar devices for allowing computer programs or other instructions to be loaded into computer system 1100. Such devices may include, for example, a removable storage unit 1118 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1118 and interfaces 1120, which allow software and data to be transferred from the removable storage unit 1118 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (e.g., channel) 1126. This channel 1126 carries signals 1128 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1114, a hard disk installed in hard disk drive 1112, and signals 1128. These computer program products provide software to computer system 1100. The invention is directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features of the present invention, as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method, comprising:
   storing, by a computer based system for repository data maximization, payment information in a payment repository coupled to the computer based system, wherein the payment information includes bank routing numbers and transaction account codes for processed payments over a given period of time;
   receiving, by the computer based system, the first electronic payment enrollment request associated with a known requestor identification code from a requestor, wherein the request includes a transaction account code and a bank routing number;
   retrieving, by the computer based system, the bank routing number from the payment repository; and
   retrieving, by the computer based system, the transaction account code from the payment repository;
   associating, by the computer based system, bank identification information with the retrieved bank routing number from the payment repository;
   presenting, by the computer based system, the retrieved bank routing number, retrieved transaction account code, and the associated bank identification information to the requestor, wherein the bank routing number and transaction account code are presented for confirmation by a requestor; and
   providing, by the computer based system, the retrieved bank routing number and the transaction account code to a processing system for processing by automatically populating the electronic payment enrollment request with the transaction account code and the bank routing number information, wherein the electronic payment enrollment request is processed without entry of the routing number or transaction account code by the requestor.

2. The method of claim 1, wherein the electronic payment enrollment request is rejected in response to the bank routing number not being confirmed.

3. The method of claim 1, wherein the electronic payment enrollment request is received from at least one of: a web site, a voice response, or a telephone call.

4. The method of claim 1, wherein the bank routing number comprises an American Banking Association routing number.

5. The method of claim 1, further comprising receiving identification code information from a requestor.

6. The method of claim 1, wherein the presented routing number is associated with the most recent processed payment of the requestor over a given period of time.

7. The method of claim 1, further comprising presenting, by the computer based system, a listing of banks associated with processed payments for selection by the requestor.

8. A method comprising:
   storing, by a computer based system for processing payment requests, payment information in a payment repository coupled to the computer based system, wherein the payment information includes bank routing numbers and transaction account codes for processed payments over a given period of time;
   receiving, by the computer based system, an electronic payment request including an entered transaction account code and an entered less than all of a bank routing number;
   querying, by the computer based system, the payment repository for all of the bank routing numbers associated with processed payments over a period of time associated with the transaction account code;
   comparing, by the computer based system, the entered less than all of the bank routing number with the query results;
   selecting, by the computer based system, a routing number, wherein a portion of the selected routing matches the entered less than all of the bank routing number;
   associating, by the computer based system, bank identification information with the retrieved bank routing number from the payment repository;
   presenting, by the computer based system, the selected bank routing number and associated bank identification information to the requestor, wherein the bank routing number is presented for confirmation by a requestor; and
   providing, by the computer based system, the retrieved bank routing number to an electronic payment request processing system for processing by automatically populating the electronic payment request with the transaction account code and the bank routing number information, wherein the electronic payment enrollment request is processed without entry of the complete routing number by the requestor.

9. The method of claim 8, wherein the entered transaction account code is less than all of the transaction account code and wherein the retrieving step further comprises:
   retrieving, by the computer based system, a complete transaction account code matched to the entered less than all of the transaction account code.

10. The method of claim 8, further comprising receiving identification code information from a requestor.

11. The method of claim 8, wherein the presented routing number is associated with the most recent processed payment of the requestor over a given period of time.

12. The method of claim 8, further comprising presenting, by the computer based system, a listing of banks associated with processed payments for selection by the requestor.

13. A system comprising:
   a tangible, non-transitory memory communicating with a processor for repository data maximization,
   the tangible, non-transitory memory having instructions stored thereon that, in response to execution by the processor, cause the processor to perform operations comprising:
      storing, by the processor, payment information in a payment repository coupled to the processor, wherein the payment information includes bank routing numbers and transaction account codes for processed payments over a given period of time;
      receiving, by the processor, an electronic payment request including an entered transaction account code and an entered less than all of a bank routing number, wherein payment information is stored in a payment repository, and wherein the payment information includes bank routing numbers and transaction account codes for processed payments over a given time;
      querying, by the processor, the payment repository for all of the bank routing numbers associated with processed payments over a period of time associated with the transaction account code;
      comparing, by the processor, the entered less than all of the bank routing number with the query results;
      selecting, by the processor, a routing number, wherein a portion of the selected routing matches the entered less than all of the bank routing number;
      associating, by the processor, bank identification information with the selected bank routing number from the payment repository;
      presenting, by the processor, the selected bank routing number and bank identification information to the requestor, wherein the bank routing number is presented for confirmation by a requestor; and
      providing, by the processor, the retrieved bank routing number to a electronic payment request processing system for processing by automatically populating the electronic payment request with the transaction account code and the bank routing number information, wherein the electronic payment enrollment request is processed without entry of the complete routing number by the requestor.

14. The system of claim 13, wherein the entered transaction account code is less than all of the transaction account code, and further configured to retrieve from the payment repository, a complete transaction account code matched to the entered less than all of the transaction account code.

15. The system of claim 13, further configured to reject the electronic payment request in response to at least one of the bank routing number or the transaction account code not being confirmed.

16. The system of claim 13, wherein the electronic payment request is received from at least one: a web site, a voice response, or a telephone call.

17. A non-transitory computer-readable medium having stored thereon sequences of instruction, the sequences of instruction including instruction which when executed by a computer-based system for repository data maximization causes the computer-based system to perform operations comprising:
   storing, by the computer based system, payment information in a payment repository coupled to the computer based system, wherein the payment information includes bank routing numbers and transaction account codes for processed payments over a given period of time;
   receiving, by the computer based system, the first electronic payment enrollment request associated with a known requestor identification code from a requestor, wherein the request includes a transaction account code and a bank routing number;

retrieving, by the computer based system, the bank routing number from the payment repository;

retrieving, by the computer based system, the transaction account code from the payment repository;

associating, by the computer based system, bank identification information with the retrieved bank routing number from the payment repository;

presenting, by the computer based system, the retrieved bank routing number, retrieved transaction account code, and the associated bank identification information to the requestor, wherein the bank routing number and transaction account code is presented for confirmation by a requestor; and providing, by the computer based system, the retrieved bank routing number and the transaction account code to a processing system for processing by automatically populating the electronic payment enrollment request with the transaction account code and the bank routing number information, wherein the electronic payment enrollment request is processed without entry of the routing number or transaction account code by the requestor.

18. The medium of claim 17, wherein the electronic payment enrollment request is rejected in response to the bank routing number not being confirmed.

19. The medium of claim 17, wherein the electronic payment enrollment request is received from at least one of: a website, a voice response, a telephone call or a customer service representative.

20. A non-transitory computer-readable medium having stored thereon sequences of instruction, the sequences of instruction including instruction which when executed by a computer-based system for repository data maximization causes the computer-based system to perform operations comprising:

storing, by the computer based system, payment information in a payment repository coupled to the computer based system, wherein the payment information includes bank routing numbers and transaction account codes for processed payments over a given period of time;

receiving, by the computer based system, an electronic payment request including an entered transaction account code and an entered less than all of a bank routing number;

querying, by the computer based system, the payment repository for all of the bank routing numbers associated with processed payments over a period of time associated with the transaction account code;

comparing, by the computer based system, the entered less than all of the bank routing number with the query results;

selecting, by the computer based system, a routing number, wherein a portion of the selected routing matches the entered less than all of the bank routing number;

associating, by the computer based system, bank identification information with the selected bank routing number from the payment repository;

presenting, by the computer based system, the selected bank routing number and bank identification information to the requestor, wherein the bank routing number is presented for confirmation by a requestor; and providing, by the computer based system, the retrieved bank routing number to a electronic payment request processing system for processing by automatically populating the electronic payment request with the transaction account code and the bank routing number information, wherein the electronic payment enrollment request is processed without entry of the complete routing number by the requestor.

21. The medium of claim 20, wherein the entered transaction account code is less than all of the transaction account code and wherein the retrieving step further comprises retrieving by the input device and from the payment repository a stored complete transaction account code matched to the entered less than all of the transaction account code.

* * * * *